2,748,173
Patented May 29, 1956

2,748,173
PROCESS FOR PREPARING MONOCHLOROHYDROQUINONE

George F. Rodgers, Kingsport, Tenn., assignor to Eastman Kodak Company, Rochester, N. Y., a corporation of New Jersey No Drawing. Application September 10, 1952, Serial No. 308,919

4 Claims. (Cl. 260—623)

This invention relates to a new process for preparing monochlorohydroquinone.

I have discovered that good yields of monochlorohydroquinone can be obtained by reacting hydroquinone with chlorine in aqueous acetic acid containing about 20% to about 50% by weight water at a temperature of from about 55° C. to about 105° C. Normally, equal or substantially equal mole proportions of hydroquinone and chlorine are employed in the reaction.

It is an object of my invention to provide an economical process for preparing monochlorohydroquinone. A further object is to provide a new process for preparing monochlorohydroquinone by reacting hydroquinone with chlorine. Another object is to provide mixtures of halogenated hydroquinones which are useful as photographic developers and which can be prepared in highly concentrated aqueous solution for sale as ready-mixed liquid developers.

In carrying out the process of my invention chlorine gas is added to a concentrated solution of hydroquinone in aqueous acetic acid containing about 20% to about 50% by weight water at a temperature of from about 55° C. to about 105° C. Preferably a refluxing temperature of from about 95° C. to about 105° C. is employed. Normally the concentration of the hydroquinone in the aqueous acetic acid at the start of the reaction varies from about 40% to 45% by weight of the hydroquinone-aqueous acetic acid reaction mixture. However, somewhat higher or lower concentrations of hydroquinone than those just stated can be employed.

The reaction mixture obtained in accordance with the process of my invention contains monochlorohydroquinone, 2,3-dichlorohydroquinone, 2,5-dichlorohydroquinone and some unreacted hydroquinone. The analysis for two such typical reaction mixtures is given hereinafter in Examples 2 and 3, respectively. Pure monochlorohydroquinone can be recovered from the reaction mixture by known methods. However, the crude reaction product, which remains after removal of the acetic acid, is of sufficient purity for a number of uses. Thus it may be converted to the bis-glycidyl ether form which is useful as a stabilizer for cellulose ester plastics such as cellulose acetate, cellulose acetate-propionate and cellulose acetate-butyrate plastics. Again, the crude reaction product can be vacuum distilled to obtain a product which is of sufficient purity for use as a photographic developer and which is completely soluble in an equal weight of water.

The following examples illustrate my invention:

EXAMPLE 1

100 cc. of glacial acetic acid, 110 grams of hydroquinone and 30 cc. of water were mixed in a suitable reaction vessel and then heated to 90° C., with agitation. 70 grams of chlorine were then gradually added to the reaction mixture over a period of about one hour. The reaction which took place was quite exothermic and the reaction mixture resulting refluxed vigorously at 90° C.– 100° C. without heating. After the addition of the chlorine, the acetic acid, water and hydrochloric acid formed during the reaction were distilled off by heating the reaction mixture to 125° C. under a reduced pressure of 70 mm. The dried product thus obtained weighed 148 grams. This material was converted to its bis-glycidyl ether form of good color and with a yield of 79% based on epoxy content which is satisfactory, for example, as a stabilizer for cellulose acetate, cellulose acetate-propionate or cellulose acetate buzate plastics.

EXAMPLE 2

500 grams of hydroquinone, 500 cc. of 80% aqueous acetic acid saturated with HCl recovered from a previous run and 110 cc. of 80% aqueous acetic acid were chlorinated with 302 grams of chlorine in accordance with the procedure described in Example 1. The dry weight of the reaction product was 650 grams. The reaction product was analyzed by infrared absorption and gave the following results:

| | Concentration, percent | Total Gms. | Percent of Hydroquinone Charged |
|---|---|---|---|
| Hydroquinone | 8 | 51.0 | 10.3 |
| 2,3-Dichlorohydroquinone | 7 | 45.0 | 5.5 |
| 2,5-Dichlorohydroquinone | 4 | 25.0 | 3.1 |
| Chlorohydroquinone (by difference) | 81 | 529.0 | 81.0 |

The procedure of Example 2 was repeated twice more. The weight of product and the infrared analysis was essentially the same in all three cases.

EXAMPLE 3

288 pounds of glacial acetic acid, 274 pounds of hydroquinone and 58 pounds of water were charged to a glass lined tank and heated together to 70° C. Heating was then discontinued and 175 pounds of chlorine were gradually passed into the reaction mixture over a period of 4½ hours. The reaction mixture was distilled to dryness under a reduced pressure of about 70 mm. The maximum temperature employed during the distillation was 125° C. 288 pounds of water were then added to the dried reaction product and distilled off to remove almost all of the residual HCl. The weight of the dried reaction product was 341 pounds. Analysis of the dried product gave the following results:

Percent
Hydroquinone _____ 9
2,2-dichlorohydroquinone _____ 5
2,5-dichlorohydroquinone _____ 7
Monochlorohydroquinone (by difference) _____ 79

Monochlorohydroquinone can be recovered from the reaction product by known techniques. However, inasmuch as the reaction product can be used without separately recovering the monochlorohydroquinone, the monochlorohydroquinone normally is not separately recovered.

Since monochlorohydroquinone appears to be chlorinated in the aqueous acetic acid employed in carrying out the invention almost as readily as hydroquinone, care should be taken to avoid the use of any substantial excess of chlorine over the theoretical amount required for formation of the monochlorohydroquinone. The composition of the product may be varied by varying the amount of chlorine used, larger amounts of chlorine causing a higher ratio of dichlorinated material with a correspondingly lower ratio of hydroquinone. If less dichlorinated material is desired, the amount of chlorine used may be lowered and a larger amount of hydroquinone will be left unchanged. The composition of the products given in the examples has been found to be quite satisfactory.

Monochlorohydroquinone has most of the chemical properties of hydroquinone itself. It is quite soluble in benzene and other aromatic hydrocarbons. A 60% solution of chlorohydroquinone in water can readily be prepared.

The bis-glycidyl ether compounds are prepared by heating the chlorohydroquinone reaction product with an excess of epichlorohydrin in the absence of air and in the presence of a basic catalyst to obtain the corresponding chlorohydroquinone di-($\beta$ - hydroxy-$\gamma$-chloro)-n-propyl ether compounds. Any unreacted epichlorohydrin is then distilled off and the chlorohydroquinone di-($\beta$-hydroxy-$\gamma$-chloro)-n-propyl ether reaction product is dissolved in a solvent and dehydrochlorinated by means of aqueous caustic to produce the corresponding chlorohydroquinone bis-glycidyl ether compounds. The solvent is then removed by distillation, preferably under reduced pressure. Inasmuch as monochlorohydroquinone, 2,3-dichlorohydroquinone and 2,5-dichlorohydroquinone are present in the reaction mixture obtained in accordance with the process of my invention, the bis-glycidyl ethers of monochlorohydroquinone, 2,3-dichlorohydroquinone and 2,5-dichlorohydroquinone are obtained. The preparation of bis-glycidyl ethers of chlorohydroquinones is illustrated hereinafter with reference to the preparation of the bis-glycidyl ether of monochlorohydroquinone. It is here noted that the bis-glycidyl ethers of chlorohydroquinones are new compounds and are described and claimed in the copending application of Milton L. Clemens, Harold Von Bramer and De Walt S. Young, Serial No. 312,638, filed October 1, 1952, now Patent No. 2,682,547.

EXAMPLE 4.—MONOCHLOROHYDROQUINONE-BIS-GLYCIDYL ETHER FROM CHLOROHYDROQUINONE

*Step A.—Preparation of chlorohydroquinone di-($\beta$-hydroxy-$\gamma$-chloro)-n-propyl ether*

MATERIALS

Chlorohydroquinone M. P. 105½–107° C. _____ 36.125 gms., 0.25 mole.
Epichlorohydrin _____ 96.25 gms., 1.0 mole.
Potassium hydroxide _____ 2.0 gms. ⎱ in 5 cc. H₂O.
Sodium hydrosulfite _____ 0.25 gm. ⎰

PROCEDURE

The chlorohydroquinone and epichlorohydrin were charged to a stainless steel reactor, purged with nitrogen for 30 minutes and heated to 60° C. The solution of potassium hydroxide and sodium hydrosulfite in water was also nitrogen purged and added to the reaction mix, which was subsequently heated for 16 hours at 67–70° C. under atmospheric pressure. The unreacted epichlorohydrin was distilled off at reduced pressure. 82.4 gms. of chlorohydroquinone di-($\beta$-hydroxy-$\gamma$-chloro)-n-propyl ether were obtained.

*Step B.—Conversion of chlorohydroquinone di-($\beta$-hydroxy-$\gamma$-chloro)-n-propyl ether into chlorohydroquinone bis-glycidyl ether*

MATERIALS

Chlorohydroquinone di-($\beta$-hydroxy-$\gamma$-chloro)-n-propyl ether from Step A _____ 82.4 gms.
Di-isopropyl ketone _____ 309 gms.
Water _____ 67 cc.
Sodium hydrosulfite _____ 0.5 gms.
Sodium hydroxide _____ 38 gms. in 77 cc. of water.

PROCEDURE

The product from Step A was dissolved in 309 gms. of diisopropyl ketone, and 67 cc. of water and 0.5 gm. of sodium hydrosulfite were added. The reaction vessel was purged with nitrogen. Next, 38 gms. of sodium hydroxide were dissolved in 77 cc. of water, nitrogen purged and added quickly to the reaction mix. The temperature was raised to 70° C. with agitation and maintained for one hour. Little or no resin, insoluble in the reaction medium was observed. The isopropyl ketone layer containing the product was water washed and the solvent was removed under vacuum.

Weight of chlorohydroquinone-bis-glycidyl ether=
62.2 gms.
Theoretical wt.=64.1
Percent epoxy oxygen=11.40.
Theoretical epoxy oxygen=12.45
Percent yield of crude=$\frac{62.2 \times 100}{64.1}$=97.0
Percent yield of available epoxy oxygen=
$\frac{62.2 \times .1140}{64.1 \times .1245} \times 100 = 88.5$
Freezing point=56.5° C.

EXAMPLE 5.—PURIFICATION OF MONOCHLOROHYDROQUINONE BY DISTILLATION

A composite sample of crude chlorohydroquinone melting at about 87° C.–96° C. was subjected to careful fractionation at reduced pressure. The main fraction boiling at 119° C.–125° C. at 4 mm. pressure and consisting essentially of monochlorohydroquinone had a melting point at 101° C.—104° C. By further fractionation under reduced pressure of the monochlorohydroquinone thus obtained monochlorohydroquinone can be obtained in even purer condition.

EXAMPLE 6.—PURIFICATION OF MONOCHLOROHYDROQUINONE BY RECRYSTALLIZATION

A pilot plant batch of crude chlorohydroquinone had a melting point of about 85° C.–90° C. and a composition as follows:

| | Percent |
|---|---|
| Monochlorohydroquinone | 80 |
| 2,5-dichlorohydroquinone | 8 |
| 2,3-dichlorohydroquinone | 5 |
| Hydroquinone | 5 |
| Insoluble material | 2 |

After recrystallization from benzene, the material had a melting point of 94° C.–98° C., and a composition as follows:

| | Percent |
|---|---|
| Monochlorohydroquinone | 87 |
| 2,5-dichlorohydroquinone | 7 |
| 2,3-dichlorohydroquinone | 2 |
| Hydroquinone | 4 |

Further recrystallizations from benzene would produce pure monochlorohydroquinone.

I claim:
1. The process for preparing monochlorohydroquinone which comprises reacting chlorine with a concentrated solution of hydroquinone in aqueous acetic acid containing about 20% to about 50% by weight water, based on the weight of the acetic acid, at a temperature of from about 55° C. to about 105° C. and wherein the proportions of chlorine and hydroquinone employed are such that substantially no more than one mole of chlorine per mole of hydroquinone is employed.

2. The process for preparing monochlorohydroquinone which comprises reacting chlorine with a concentrated solution of hydroquinone in aqueous acetic acid containing about 20% to about 50% by weight water, based on the weight of the acetic acid, at a refluxing temperature of from about 95° C. to about 105° C. and wherein the proportions of chlorine and hydroquinone employed are such that substantially no more than one mole of chlorine per mole of hydroquinone is employed.

3. The process for preparing monochlorohydroquinone which comprises reacting chlorine with a concentrated solution of hydroquinone in aqueous acetic acid containing about 20% to about 50% by weight water, based on the weight of the acetic acid, at a temperature of from about 55° C. to about 105° C. and wherein substantially equal mole proportions of chlorine and hydroquinone are employed.

4. The process for preparing monochlorohydroquinone which comprises reacting chlorine with a concentrated solution of hydroquinone in aqueous acetic acid containing about 20% to about 50% by weight water, based on the weight of the acetic acid, at a refluxing temperature of from about 95° C. to about 105° C. and wherein substantially equal mole proportions of chlorine and hydroquinone are employed.

References Cited in the file of this patent

UNITED STATES PATENTS

| | | |
|---|---|---|
| 1,912,744 | Bramer et al. | June 6, 1933 |

FOREIGN PATENTS

| | | |
|---|---|---|
| 950,265 | France | Mar. 21, 1949 |

OTHER REFERENCES

Eckert et al.: Chem. Abstracts, vol. 16, page 3881 (1922).